United States Patent
Bode

(10) Patent No.: US 9,234,429 B2
(45) Date of Patent: Jan. 12, 2016

(54) METHOD FOR PRODUCING A COMPRESSOR BLADE BY FORGING AND UNIAXIALLY STRETCHING

(71) Applicant: SIEMENS AKTIENGESELLSCHAFT, München (DE)

(72) Inventor: Ralf Bode, Moers (DE)

(73) Assignee: SIEMENS AKTIENGESELLSCHAFT (DE)

( * ) Notice: Subject to any disclaimer, the term of this patent is extended or adjusted under 35 U.S.C. 154(b) by 109 days.

(21) Appl. No.: 14/343,096

(22) PCT Filed: Sep. 17, 2012

(86) PCT No.: PCT/EP2012/068211
§ 371 (c)(1),
(2) Date: Mar. 6, 2014

(87) PCT Pub. No.: WO2013/037999
PCT Pub. Date: Mar. 21, 2013

(65) Prior Publication Data
US 2014/0215822 A1 Aug. 7, 2014

(30) Foreign Application Priority Data
Sep. 16, 2011 (DE) .......................... 10 2011 082 850

(51) Int. Cl.
*F01D 5/14* (2006.01)
*B21K 3/04* (2006.01)
(Continued)

(52) U.S. Cl.
CPC . *F01D 5/147* (2013.01); *B21K 3/04* (2013.01); *B23P 15/02* (2013.01); *C21D 7/02* (2013.01);
(Continued)

(58) Field of Classification Search
CPC ........... F01D 5/147; F01D 5/005; F01D 5/14; B23P 15/02; C21D 7/02; C21D 9/0068; C21D 7/10; B21K 3/04; Y10T 29/49336; Y10T 29/4932
See application file for complete search history.

(56) References Cited

U.S. PATENT DOCUMENTS 4,272,305 A * 6/1981 Weingerl ................ C22C 38/58
148/327
5,636,440 A * 6/1997 Bichon ................ B21D 26/055
29/889.7
(Continued)

FOREIGN PATENT DOCUMENTS

DE 3207276 A1 10/1982
EP 0976469 A2 2/2000
(Continued)

OTHER PUBLICATIONS

PCT/EP2012/068211 International File Date: Sep. 17, 2012—International Search Report; Siemens Aktiengesellschaft; 3 pages.
(Continued)

*Primary Examiner* — Ryan J Walters
(74) *Attorney, Agent, or Firm* — Schmeiser Olsen & Watts LLP

(57) ABSTRACT

The invention relates to a method for producing a compressor blade, comprising the following steps: forging a blank made of an austenitic-ferritic steel; uniaxially stretching and plastically deforming the blank while at least the elongation and the deformation force of the blank are detected and monitored; and ending the stretching after a defined limit value for the stress has been reached.

5 Claims, 2 Drawing Sheets

Figure 4:
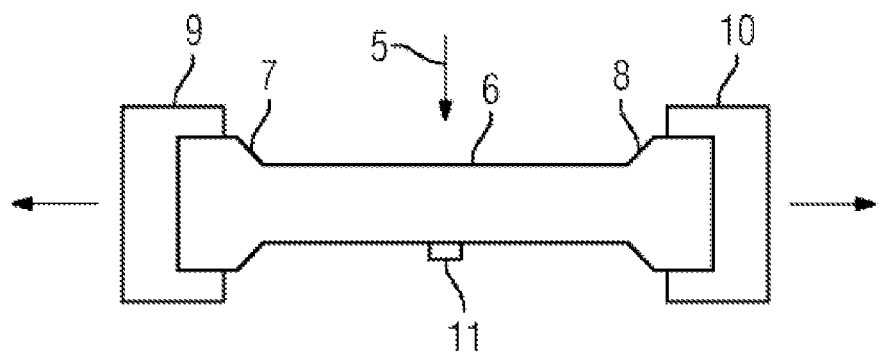

(51) Int. Cl.
*C21D 7/02* (2006.01)
*C21D 9/00* (2006.01)
*B23P 15/02* (2006.01)
*F01D 5/00* (2006.01)
*C21D 7/10* (2006.01)

(52) U.S. Cl.
CPC .............. *C21D 9/0068* (2013.01); *F01D 5/005* (2013.01); *C21D 7/10* (2013.01); *F01D 5/14* (2013.01); *Y10T 29/4932* (2015.01); *Y10T 29/49336* (2015.01)

(56) References Cited

U.S. PATENT DOCUMENTS

| | | | |
|---|---|---|---|
| 8,257,047 B2 | 9/2012 | Mueller | |
| 2004/0020049 A1* | 2/2004 | Brock | B23P 15/02 29/889.7 |
| 2005/0211347 A1 | 9/2005 | Carlsso et al. | |
| 2006/0130553 A1 | 6/2006 | Roth-Fagaraseanu | |
| 2013/0343897 A1* | 12/2013 | Collins | F01D 5/14 416/223 R |

FOREIGN PATENT DOCUMENTS

| | | |
|---|---|---|
| GB | 634583 A | 3/1950 |
| JP | 62187538 A | 8/1987 |
| WO | 2012052359 A1 | 4/2012 |

OTHER PUBLICATIONS

Spezielle Werkstoffe Fuer Die Kalt—Und Warmformgebung; Frank Wilke, Spezielle Werkstoffe Fuer Die Kalt—Und Warmformgebung, Bericht 2003, ThyssenKrupp Steel; 2003.

* cited by examiner

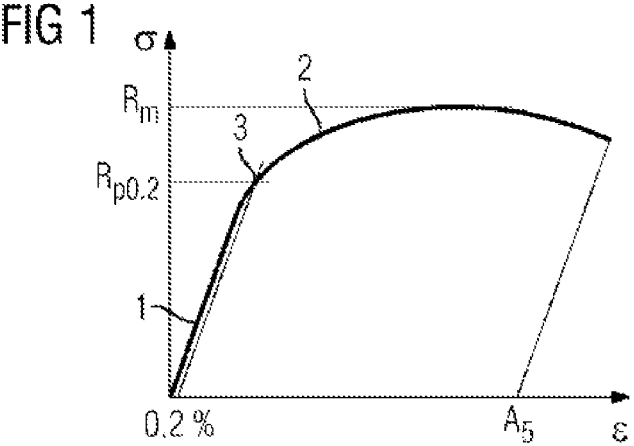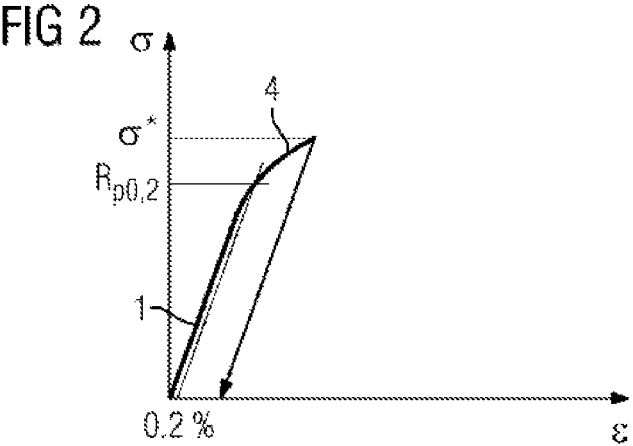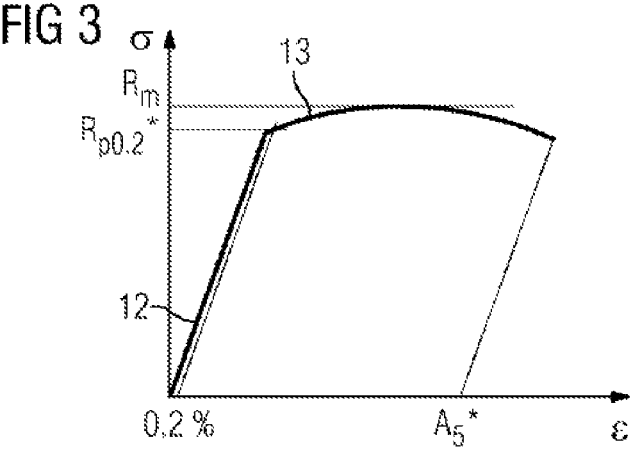

METHOD FOR PRODUCING A COMPRESSOR BLADE BY FORGING AND UNIAXIALLY STRETCHING

CROSS-REFERENCE TO RELATED APPLICATIONS

This application claims priority to PCT Application No. PCT/EP2012/068211, having a filing date of Sep. 17, 2012, the entire contents of which are hereby incorporated by reference.

FIELD OF TECHNOLOGY

The following relates to a method for producing a compressor blade.

BACKGROUND

Compressor blades for axial compressors, which take in atmospheric air, are at risk of corrosion. The two first compressor stages in particular are problematic, since the air taken in in this region can contain moisture. In the rear compressor stages, the air is heated by the compression and is therefore dry. In practice, a particularly corrosion-resistant material is therefore used for compressor blades in the two first rows. This is intended to prevent damage caused by material fatigue as a consequence of the reduction in fatigue strength owing to corrosion. To this end, use is generally made of a duplex steel having a low 0.2% elongation limit. Steels of this type have a two-phase microstructure consisting of a ferrite matrix with islands of austenite. However, the low elongation limit restricts the permissible centrifugal force and, as a result, the rotational speed of the axial compressor. The possible structural designs of compressor blades are thus limited by the material properties, in particular in the case of what are termed lock blades.

EP 0 005439 A1 discloses the use of a ferritic-austenitic Cr—Ni steel for forged turbine blades. The document states that a blade is cut and the mechanical quality values are determined, it being necessary, with a double degree of deformation, for the notch impact strength to already be more than 35 joules at a minimum yield strength of 600 N/mm$^2$ JP 62187538 A, WO 03/076100 A1 and EP 0 976 469 A2 each explain the production of a product made of steel, wherein the increase in the elongation limit can be realized by plastic deformation of the workpiece.

In the case of conventional axial compressors, the rotational speed is limited, and therefore the 0.2% elongation limit is not exceeded in the compressor blades. It is disadvantageous in this respect, however, that high production costs arise in the case of correspondingly constructed lock blades. As an alternative, it has already been proposed to use a nickel-base alloy having a high 0.2% elongation limit and high corrosion resistance for compressor blades, but a nickel-base alloy of this type leads to very high costs and causes a high specific weight.

SUMMARY

An aspect relates to a method for producing a compressor blade which makes inexpensive production possible.

The method of the type mentioned in the introduction having includes the following steps: forging a blank from an austenitic-ferritic steel, uniaxially stretching and plastically deforming the blank, while at least the elongation and the deformation force of the blank are detected and monitored, and ending the stretching after a defined limit value for the stress has been reached.

By stretching the blank, some of the plastic deformability of the austenitic-ferritic steel used can be utilized for considerably increasing the 0.2% elongation limit of the material. The austenitic-ferritic steel, which is also referred to as duplex steel, is distinguished by a high plastic deformability, the elongation at break thereof being at least 25%. In contrast, a martensitic steel having an elongation at break of merely at least 14% is used for the rear stages of the axial compressor.

It is thereby possible for the 0.2% elongation limit of the blanks to be increased significantly, wherein the elongation at break has approximately the same value as in the rear blade rows. A targeted, monitored procedure in which the blanks are elongated in a controlled manner is exemplary for embodiments of the method, with the elongation and the deformation force, and possibly also other process parameters, being detected and monitored.

In embodiments of the method, it is preferable that the limit value provided for the stretching of the blank is a stress which corresponds to the intended 0.2% elongation limit, without the elongation at break, which is subsequently still present dropping below a value of approximately 14%. This value is to be understood as an approximate value. For specific applications, it is also possible for a lower or higher limit value to be provided. For example, the elongation at break could be between 10% and 20%.

In order to precisely set the desired material parameters, in particular the 0.2% elongation limit, provisions can be made that the tensile force applied during the stretching of the blank and/or the instantaneous cross section of the blank is or are detected. According to a development of an embodiment of the method, the elongation can be controlled or regulated in order to control the stretching process. In this respect, the instantaneous cross section of the blank is measured and monitored, if appropriate also at a plurality of points, in order to adapt the tensile force, if necessary, by a reduction or an increase. It is thereby ensured that the stretching process is ended when the defined limit value for the stress has been reached. This has the effect that all compressor blades in a blade row have virtually identical material parameters, and therefore they have a uniform behavior. In particular, the compressor blades have a uniformly increased elongation limit $R_{p0.2*}$. The stretching of the blanks leads to cold work-hardening; the blanks then being distinguished by a considerably higher elongation limit and the tensile strength remaining approximately unchanged.

The targeted, monitored procedure provided in embodiments of the method ensures that the cross section of the blank is substantially homogeneously deformed.

Within the context of the method, it can be provided that a blank is divided up after the stretching, in order to produce a plurality of compressor blades therefrom. The blank is then milled into shape, in order to produce a desired profile.

In addition, the present disclosure relates to a compressor blade. The compressor blade is distinguished by the fact that it has been produced by a method of the type described. In particular, the compressor blade is produced from a blank by controlled stretching and plastic deformation. Further configurations are described in the dependent claims.

BRIEF DESCRIPTION

Figure 5:
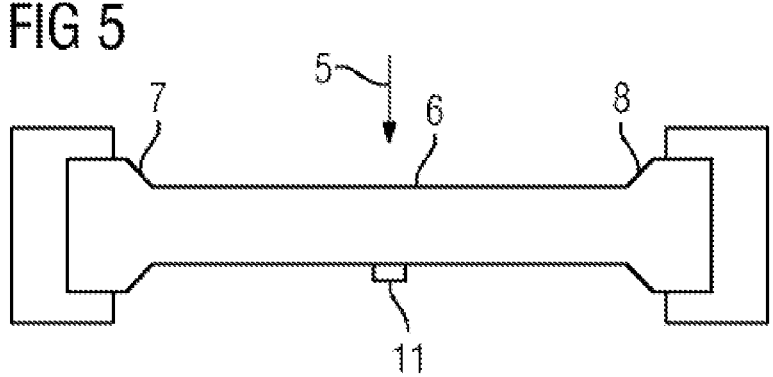

Further advantages and details of the invention will be explained on the basis of an exemplary embodiment with reference to the drawings. The drawings are schematic illustrations, wherein:

FIG. 1 depicts a first a stress-strain graph;
FIG. 2 depicts a second stress-strain graph;
FIG. 3 depicts a third stress-strain graph;
FIG. 4 depicts an embodiment of a blank for a compressor blade before stretching, and
FIG. 5 depicts an embodiment of the blank shown in FIG. 4 after stretching.

DETAILED DESCRIPTION

FIG. 1 is a first stress-strain graph, the strain being plotted on the abscissa and the stress on the ordinate.

An austenitic-ferritic steel is used for the method for producing a compressor blade. This stainless steel is also referred to as duplex steel. Firstly, a blank is forged from this steel. The blank is square bar stock, which is later divided up. In this way, a plurality of compressor blades can be produced from one blank. It is evident from FIG. 1 that the steel initially has a linear-elastic behavior under tensile loading, this region being denoted by the reference sign 1. This is adjoined by a plastic region, i.e. when a specific elongation has been exceeded, plastic deformation remains after load relief. The 0.2% elongation limit 3 can be used, for example, as the limit value between the linear-elastic region 1 and the plastic region 2; at this point of the stress-strain graph, the material has an elongation of 0.2% with respect to its initial state. It can be seen in FIG. 1 that the duplex steel used has a high plastic deformability; the elongation at break $A_5$ being approximately 25%. During the plastic deformation, a maximum stress $R_m$ is reached, denoting the tensile strength.

In the method for producing a compressor blade, use is made of the fact that cold work-hardening of the material occurs during plastic deformation. To this end, the deformation process, in particular the stretching, is interrupted in a targeted manner.

FIG. 2 shows a second stress-strain graph, in which the blank is initially elongated in the linear-elastic region 1. Then, the start 4 of the plastic region is passed through, until a specific elongation has been reached. When a defined limit value for the stress has been reached, the stretching process is interrupted, so that a certain, permanent deformation is present.

FIG. 4 schematically shows a blank 5 having a central region 6 and end portions 7, 8 with an enlarged diameter. The end portions 7, 8 are clamped into clamping jaws 9, 10 of a tensile machine. A homogeneous, uniaxial tensile force is exerted on the blank 5 by the axial movement of one of the clamping jaws. A measuring system 11 for detecting the actual cross section is arranged on the blank 5. The measuring system supplies a signal indicating the size of the actual, instantaneous cross-sectional area of the blank 5 at any point in time during the stretching process. The stress which actually prevails can therefore be determined at any time on the basis of the applied tensile force by division by the actual cross-sectional area, and can be regulated by the elongation. The pulling or stretching process is ended when the defined stress has been reached. In the exemplary embodiment shown, the stretching process is ended when a stress σ* lying significantly above $R_{p0.2}$ has been reached.

FIG. 5 shows the blank 5 shown in FIG. 4 after the end of the stretching process. By virtue of the tensile force applied by the tensile machine, the blank 5 has been plastically deformed, but only in the central region 6 thereof, not in the region of the end portions 7, 8. On account of the monitored procedure, the entire cross section of the blank 5 has been homogeneously deformed, and therefore the stretched blank 5 shown in FIG. 5 has extremely homogeneous properties.

FIG. 3 shows a third stress-strain graph depicting the behavior of the blank after stretching. The cold work-hardening which has arisen as a result of the stretching has the effect that the elongation limit $R_{p0.2*}$ is increased compared to the corresponding elongation limit before stretching, which is shown in FIGS. 1 and 2. This means that a compressor blade produced from such a blank can withstand a greater stress during operation, and therefore an axial compressor having such compressor blades can be operated at a higher rotational speed.

The linear region 12 is adjoined by a plastic region 13, where the tensile strength $R_m$ has remained unchanged compared to the unstretched blank. The elongation at break $A_5^*$ has merely been slightly reduced compared to the elongation at break $A_5$ of the unstretched blank, which is shown in FIG. 1. The elongation at break $A_5^*$ has been reduced by the value corresponding to the stretching process, but this reduction is not disadvantageous on account of the altogether high elongation at break of the duplex steel.

After the end of the stretching process, the pre-elongated blank is divided up into individual segments, and the desired profile contour of the compressor blade is generated by a milling process.

Although the invention has been illustrated and described in more detail by the preferred exemplary embodiment, the invention is not limited by the examples disclosed, and other variations may be derived therefrom by a person skilled in the art without departing from the scope of protection of the invention.

The invention claimed is:

1. A method for producing a compressor blade, comprising the following steps:
   forging a blank from an austenitic-ferritic steel;
   uniaxially stretching and plastically deforming the blank, while at least an elongation and a deformation force of the blank are detected and monitored; and
   ending the stretching after a defined limit value for stress has been reached; wherein the defined limit value for the stretching of the blank is an intended 0.2% elongation limit.

2. The method as claimed in claim 1, wherein a tensile force applied during the stretching of the blank and/or an instantaneous cross section of the blank is/are detected.

3. The method as claimed in claim 1, wherein a cross section of the blank is substantially homogeneously deformed.

4. The method as claimed in claim 1, wherein the blank is divided up after the stretching to produce a plurality of compressor blades therefrom.

5. The method as claimed in claim 4, wherein the divided blanks are face-milled after the division to produce a certain profile.

* * * * *